United States Patent [19]
Erickson et al.

[11] Patent Number: 5,673,110
[45] Date of Patent: Sep. 30, 1997

[54] MULTIPLEXED LASER INTERFEROMETER FOR NON-DISPERSED SPECTRUM DETECTION IN A DYNAMIC FLYING HEIGHT TESTER

[75] Inventors: Tod L. Erickson, San Jose; John P. Lauer, Palo Alto, both of Calif.

[73] Assignee: Phase Metrics, Inc., San Diego, Calif.

[21] Appl. No.: 634,670

[22] Filed: Apr. 17, 1996

Related U.S. Application Data

[63] Continuation of Ser. No. 9,281, Jan. 26, 1993, abandoned.

[51] Int. Cl.$^6$ .................................................. G01B 9/02
[52] U.S. Cl. .................................................. 356/357
[58] Field of Search .............................. 356/357, 358, 356/355, 349, 4.5; 369/55, 56

[56] References Cited

U.S. PATENT DOCUMENTS

| | | | |
|---|---|---|---|
| 4,180,830 | 12/1979 | Roach | 356/355 |
| 4,293,224 | 10/1981 | Gaston et al. | 356/357 |
| 4,552,457 | 11/1985 | Giallorenzi et al. | 356/349 |
| 4,554,460 | 11/1985 | Klein | 250/578 |
| 4,593,368 | 6/1986 | Fridge et al. | 356/357 |
| 4,630,926 | 12/1986 | Tanaka et al. | 356/357 |
| 4,632,554 | 12/1986 | Pearce | 356/349 |
| 4,813,782 | 3/1989 | Yagi et al. | 356/357 |
| 4,866,593 | 9/1989 | Miura et al. | 346/107 |
| 5,105,451 | 4/1992 | Lubinsky et al. | 250/315.3 |

FOREIGN PATENT DOCUMENTS

| | | | |
|---|---|---|---|
| 2156105 | 6/1990 | Japan | 356/357 |

OTHER PUBLICATIONS

"A Visible Laser Interferometer for Air Bearing Separation Measurement to Submicron Accuracy", Nigam, Journal of Lub. Tech., Jan. 1982.

"Estimation of the Zero–Spacing Error Due to a Phase Shift of Reflected Light in Measuring a Magnetic Head Slider's Flying Height by Light Interference", Muranush et al, Advanced Info. Storage Systems, 1992.

Chris Lacey, et al., "A New Method for Measuring Flying Height Dynamically," IDEMA's DISKON '92 Technical Proceedings, pp. 27–42.

*Primary Examiner*—Samuel A. Turner
*Attorney, Agent, or Firm*—Blakely Sokoloff Taylor & Zafman

[57] ABSTRACT

A preferred embodiment of the present invention comprises two laser sources of different frequency monochromatic light that are time-multiplexed through a beam combiner to produce composite beams that are steered to a gap between a slider and a disk. A reflected light that includes an interference pattern is then directed to an aperture plate that permits a spot of light to be directly detected by a photodiode which reads the intensity. Measurements of the intensity are taken at respective time-points to sample each laser source, and the measured intensities are compared to determine the slider to disk spacing. Since different frequency light will have different intensity for the same spacing, integer ambiguities can be directly resolved. In an alternative embodiment, several photodiode detectors are included with a multi-aperture plate that permits the simultaneous assessment of disk-to-slider spacing at several points of the slider dictated by the placement of multiple composite laser beams and the respective apertures.

5 Claims, 3 Drawing Sheets

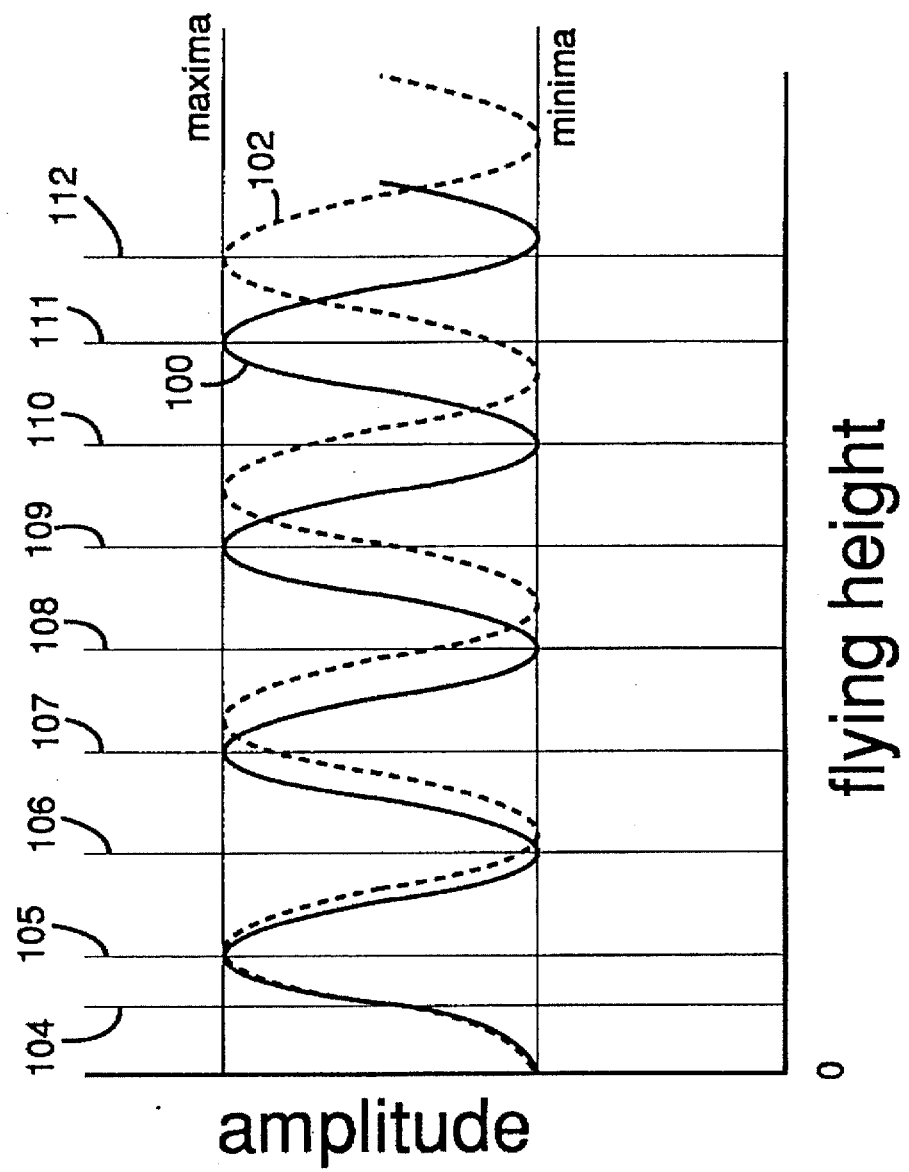

MULTIPLEXED LASER INTERFEROMETER FOR NON-DISPERSED SPECTRUM DETECTION IN A DYNAMIC FLYING HEIGHT TESTER

This application is a continuation of Ser. No. 08/009,281 filed Jan. 26, 1995, which is now abandoned.

BACKGROUND OF THE INVENTION

1. Field of the Invention

The present invention relates generally to interferometry, and more particularly to dynamic flying height testers for disk drive design that time-multiplex monochromatic light through an aperture to a simple detector without dispersion of the light.

2. Description of the Prior Art

The heads in many high density disk drives actually fly above the magnetic surface of the disk media. The "flying height" is a critical parameter and must be carefully and accurately measured to assure optimum performance. However, such flying heights are of exceeding small dimensions, on the order of a few microns, and thus are a challenge to measure accurately. Several methods are conventionally employed in the background art to measure flying heights. These include capacitance, laser Doppler vibrometry (LDV), monochromatic interferometry and white light interferometry.

The capacitance method measures the electrical capacitance between a slider head and a disk, which is proportional to the distance separating them.

The LDV method is based on a phenomenon in which light reflected from a moving surface will be shifted in frequency by an amount proportional to the velocity. A laser beam is split into a measurement ray and a reference ray. The measurement ray is frequency shifted with a Bragg cell prior to being focused on a slider head. After being recombined with the reference ray, an amplitude modulation will be present. Frequency demodulation of the signal yields slider velocity and phase demodulation yields slider displacement.

The monochromatic method directs a light beam towards a beam splitter and through a glass disk to reflect off a slider head. The reflected light interferes with that from the glass disk and a detector is used to observe the interference of the two lights. Depending on the spacing of the slider, the reflected lights will either add or subtract from one another, thus modulating the light amplitude. Characteristic light amplitude minimas and maximas will occur at predictable slider spacings. Chris Lacey, et al., in "A NEW METHOD FOR MEASURING FLYING HEIGHT DYNAMICALLY," DISKCON '92 Technical Proceedings, International Disk Drive Equipment and Materials Association (IDEMA), pp. 27–42, state that "the disadvantage of standard monochromatic interferometry is that fringe-counting techniques do not have the resolution required to measure today's low flying height sliders." Gray-level detection and computer analysis is thus required.

In U.S. Pat. No. 4,593,368, Fridge, et al. describe an interferometer technique for measuring small gaps, such as the space between glass disks and magnetic heads or sliders during operation. A broad spectrum (white) light is used to illuminate a gap between two non-contacting surfaces where the light combines constructively and destructively, according to light frequency and the slider spacing, creating the characteristic amplitude patterns. Diffraction gratings are used to disperse the reflected light so that an array of detectors, each of which are placed at a critical angle, can measure the corresponding amplitudes concurrently at various key frequencies. Chris Lacey, et al., observe that accurate measurements for spacings less than five microinches are difficult because there are no longer any peaks or valleys in an intensity versus wavelength relationship.

Chris Lacey, et al., suggest a combination of LDV and capacitive methods for ultra-low flying height measurements without the need for special algorithms or lengthy data acquisition times. However, a mercury arc light source is used that outputs high intensity light at wavelengths of 436, 548 and 580 nanometers. The light produces a beam that is ultimately steered toward three different interference filters and photo diode detectors. Such a detection system is complex and expensive to implement.

Early fringe analysis systems relied on a visual interpretation of interference fringe patterns at a disk and read/write head interface.

More recent systems, such as the Cambrian FHT-900 digital-flying height tester use a computer-driven spectraradiometer, instead, to automatically compute flying heights. Menu driven software provides color displays for interpretation of test results. A computer monitor and an independent video camera monitor for viewing the magnified slider image are used with the system. Flying height is calculated from an analysis of color interference patterns which are caused by a slider separation. Such white-light interferometry reflects light from the bottom of a glass disk and light reflected from a flying surface of a head travels a slightly different distance before reaching the optical assembly of the tester. This distance is the flying height. An optical path difference in length results in a phase difference between light which has followed the two paths. The amount of phase shift depends on the light wavelength. Vector addition of the individual light wavelengths results in characteristic destructive or constructive light interference. The amount of intensity increase or decrease depends on the degree of phase shift for each wavelength, which, in-turn, depends on the head-to-disk spacing.

Light reflected from a closely spaced slider and glass disk exhibits changes as a function of spacing changes in its characteristic spectrum due to a phenomenon of the physics of light. An amplitude increase occurs at some light wavelengths, and an amplitude decrease occurs at other wavelengths. Such color bands are typically visible on a system's video monitor.

A few prior art flying height testers determine flying height by analyzing the relative intensity of the various wavelengths (colors) of light. Such wavelength versus intensity data is used to find an equation for a curve which fits the data. A relation between the measured flying height versus light spectrum is generated to later help estimate the flying height from real-time data collection. Small changes in flying height typically yield large differences in the measured spectrum, thus high measurement resolution is possible. Measured and theoretical curves are compared to determine a standard deviation of measured versus theoretical intensity at each wavelength. The flying height "answer" is iterated until a flying height is found which results in a minimum standard deviation. Individual data points are eliminated if they deviate excessively from the theoretical spectrum for a "best-fit" result, and a new final curve fit is constructed. An output of this final curve fit routine is a reported flying height.

Measurement test routines conventionally include four, five, six or seven point production mode tests; multiple point engineering mode tests of up to one hundred points; pitch; roll; slider crown; slider coplanarity; flying height versus spindle speed; flying height versus linear velocity; flying height versus radius; and rotary actuator simulation. Test results are usually displayed on a computer monitor, and can be copied to a printer. Many prior art systems can also store test results on a computer hard disk, floppy disk, or output to a serial utility port. Data is stored in formats suitable for analysis by statistical process control programs.

Prior art flying height testers often are controlled by an IBM-AT compatible computer with operating software stored on a rigid disk drive. A math coprocessor, if included, is used to minimize the execution times of numerical analysis software. A standard computer configuration includes an Intel 386-type computer with 25 MHz clock and two megabyte memory, a math coprocessor, a VGA-type color graphics interface and monitor, a forty megabyte hard disk drive and a two hundred watt power supply.

A typical prior art optics assembly, such as that included in the Cambrian FHT-900, has a xenon wide-spectrum light source, an objective lens, a beam splitter assembly, a Photo Research PR-700 Series Spectraradiometer and a video camera which is provided for operator convenience in positioning a measurement spot. The xenon light source includes a high intensity arc lamp, associated lenses and a fiber optics light guide to provide a high intensity, broad spectrum light to illuminate a head-to-disk interface. The objective lens collimates reflected light from the head-to-disk interface and provides image magnification. An amount of magnification controls the size of the measurement spot. On the video monitor, the measurement spot appears as a small black dot. A reported flying height is actually an average of the overall flying height of the area of the measurement spot. Simple and rapid changes of the objective lens assembly is a major feature of the FHT-900. Image magnification is used to vary an effective measurement spot size from two mils for testing thin film sliders with a pronounced grain structure, to 0.5 mils for testing center rails on monolithic heads, to 0.75 mils for most other applications.

A beam splitter assembly typically includes a beam splitter and a beam splitter mount. A beam splitter comprises a partially silvered mirror which is mounted at a 45° angle to a beam from high-intensity light source. The beam splitter directs the beam to an objective lens assembly that focuses such light on a head-to-disk interface. Reflected light from a slider and disk is collimated by the objective lens and directed back to the beam splitter.

Approximately half of the light reflected from a head-to-disk interface passes directly through a beam splitter and is reflected into a spectraradiometer that analyzes a small portion of the light. The large remainder of the light is reflected into a video camera that provides a picture for a user to target the spot placement.

A conventional spectraradiometer, such as the Photo Research SpectraScan 700 series, analyzes the spectral content of light reflected from a head-to-disk interface, and will transmit the results to a computer for a flying height calculation. Light typically enters the spectraradiometer and is directed to a mirror with a Pritchard aperture (a very small hole). The spectraradiometer analyzes light which passes through the Pritchard aperture by measuring the amplitude of the light at various wavelengths. Because some light passes through the Pritchard aperture and is not reflected to the video camera, a dark spot appears near the middle of the video screen to a user. The light passing through the Pritchard aperture is focused on a diffraction grating and is thereby separated into its constituent wavelengths. The diffracted spectrum can then be focused onto a diode array which can detect light wavelengths between 390 and 730 nanometers. The light spectra is conventionally detected in two nanometer intervals. Thus 170 discrete "pixels" of intensity versus wavelength data are made available to an analog-to-digital converter (ADC) connected to a computer. The resulting intensity data can be read into data arrays by software to be manipulated in a process of curve fitting and other well-known flying height calculation routines.

Prior art head positioner X-Y carriage assemblies are used for precise mounting, alignment, and linear movement of the heads under test. Movement is provided, e.g., in the Cambrian FHT-900, by orthogonal linear cross roller slides driven by stepper motors. An X-axis stepper motor rotates a precision ten turns-per-inch lead screw. An Y-axis stepper motor rotates a twenty turns-per-inch leadscrew. Z-axis positioning controls the distance between the surface of the glass disk and the flexure mounting surface. This distance is commonly called Z-height. Z/height is continuously adjustable with a Z-stage micrometer and is directly indicated by a dial indicator. Spectraradiometer and related lens assemblies are mounted on an independent X-Y stage with cross roller slides. Two axis adjustment from a keyboard cursor keys or from a proportional joystick controller is possible. The slides are driven by stepper motors with COMPUMOTOR PC23 series indexers and Parker COMPUMOTOR DB drive modules.

A precision two-axis stage allows positioning of the measurement spot to the desired location on a head's air bearing surface. The two-axis stage includes X and Y axis motorized slides which allow a measurement point to be positioned to several locations on a slider, using keyboard cursor control keys, with the system joystick, or automatically under software control. Production mode measurements may be made from a virtually unlimited number of locations. Points, X-Y coordinates and calculated result formulas are stored in a table and can be edited by a user. In an engineering mode, an X-Y coordinate system is used to locate from one to one hundred test points on a head. Test results can be printed and/or logged to a disk drive in an industry-standard American standard for communication interface and interconnection (ASCII) file.

Class-seven ball bearing spindles equipped with integral brushless DC motors are often used in prior art testers. Non-repeatable runout at the hub is typically within twenty microinches (0.63 micron). Alternatively, air bearing spindles are used for applications requiring a higher degree of precision.

Glass disks are centered on a precision ground radial registration surface. Interchangeable hubs are used to enable a spindle to be quickly configured to accommodate standard disk sizes. High torque, low inertia, brushless DC motors integrally mounted to a spindle assembly eliminate vibration caused by coupling mechanisms. Brushless DC motors and controllers are capable of accelerating an inertial load. Driver circuits are typically tuned to avoid excessive acceleration. Spindle rotation speed is conventionally software controlled and can be varied from 611 to 8000 RPM in approximately one RPM increments.

Flying heights may be measured at "n" number of point locations on a slider, depending on the type of slider and on the type of test data being measured or calculated for each slider. Each test point position is typically defined by independent X-Y coordinates. An optics positioner moves a measuring spot to a first measurement location on a slider by calculating the X and Y translation from an alignment point on the head. This datum point may be automatically located or manually positioned with a joystick or cursor keys. After the alignment point is established, the optics positioner sequentially locates each measurement spot. The flying height at each location is typically reported on a computer screen. Slider and disk pitch, roll, coplanarity and crown may be computed from six, seven or more point test results and reported in a test results summary. Such a summary often includes the measured and calculated results and a summary of the test conditions. A user can usually elect to automatically print test results after each test and/or automatically save the results on a hard disk, floppy disk, or serial port.

A test sequence may be repeated at "n" test radii. The second outside diameter (OD) test radius and a corresponding spindle speed or linear velocity may be specified by a user in a screen menu. Independent OD test radius pass/fail criteria is typically specified in a reject criteria menu.

A four point test measures flying heights at four locations on an air bearing surface. Typically, these test locations are at the four corners of the air bearing surface. However, test points may be placed elsewhere on the air bearing surface by specifying the appropriate X-Y coordinates in a slider parameters menu. Pitch and roll may also be calculated from test results. A minimum of six points usually must be measured if coplanarity or crown results are required.

A five point test is often used with monolithic heads. The fifth test point is typically located on a trailing edge of a center rail, or at another location on the air bearing surface. A test is activated in an execution menu. In many instances, the fifth measurement point is on a center rail, pole glass, or other location with unique spectral characteristics. An independent set of center rail measurement parameters is typically provided to avoid using the same parameters for measurements at locations with different optimum parameter values.

A six point test adds a test point on each slider rail to a typical four point test. These test points are typically located in the center between an outer and inner pair of rails. The flying height of each of the six points is measured and reported in a test result. Pitch, roll, crown, and coplanarity are calculated from the measured flying heights and reported along with the flying heights.

A seven point test adds a point to a typical six point test sequence. As in the five point test, points are tested with their own set of optimized measurement parameters, and may be located anywhere on the air bearing surface.

Software also exists in the prior art that allows a virtually unlimited number of measuring points, calculation formulas and test radii ("zones"). An association amongst test radii, points and calculations and reject criteria is provided via multiple tables or "sets", and a set-to-set mapping facility.

Test results are typically compared, as in the Cambrian FHT-900, to a set of pass/fail criteria which are conventionally located in computer driven reject criteria menus. Flying height data taken at each of the measurement points are compared to minimum and maximum flying height value limits predefined for each point. Pitch, roll, crown, and coplanarity may be calculated from the flying height measurement results. An independent calculation-reject-criteria menu may be used to specify the minimum and maximum acceptable calculated result for each parameter.

A head typically passes a production test if a flying height at each test point stays within individual minimum and maximum values, and if the result of each pitch, roll, crown, and coplanarity calculation does not exceed the bounds of a calculation reject criteria.

Engineering mode tests can provide useful information to process and design engineers, e.g., flying heights may be measured as a function of spindle speed, linear velocity, and test radius. Additional tests measure flying heights on an air bearing surface. Flying heights for up to one hundred predetermined locations on a slider may be measured with conventional, prior art equipment.

A flying height versus linear velocity test is useful for measuring flying height as a function of disk velocity. After positioning a measurement spot to a desired slider location, a top and bottom pair of linear velocities is specified, together with a linear velocity test increment. A flying height versus spindle speed test is similar to the flying height versus linear velocity test. The lowest and highest test speed is specified along with an increment value. In flying height versus test radius routines, flying heights at specific locations on a slider are measured as a function of disk radius. A starting and an ending test radius, a test increment, and a spindle speed or linear velocity are usually specified. The flying height versus radius test can be performed with a radius/skew profile equivalent to many rotary actuator disk drives. A set of five-parameters may typically be used to define a drive's geometry. After supplying these parameters, a user activates a flying height versus radius/skew test. Exact duplication of a particular drive's skew at each test radius will allow a user to investigate a flying height profile of an existing drive, and to investigate the results of possible drive geometry modifications.

SUMMARY OF THE INVENTION

It is therefore an object of the present invention to provide a system for dynamic flying height measurement that allows for the detection of reflected light signals with a simple apparatus that does not depend on dispersing light to spectrally separate-out various light wavelengths for interpretation.

It is a further object of the present invention to provide for measurements of slider head dynamic flying height in a disk drive environment that are accurate and reliable.

Briefly, a preferred embodiment of the present invention comprises two laser sources of different frequency monochromatic light that are time-multiplexed through a beam combiner to produce a single beam that is steered to a gap between a slider and a disk. A reflected light is then directed to an aperture plate that permits a spot of light to be directly detected by a photodiode which reads the analog intensity. Measurements of the analog intensity are taken at respective time-points to sample each laser source, and the two measured intensities are compared to determine the slider to disk spacing. Since different frequency light will have different minima and maxima points for the same spacing, integer ambiguities can be directly resolved. In an alternative embodiment, several photodiode detectors are included with a multi-aperture plate that permits the simultaneous assessment of disk-to-slider spacing at several points of the slider, as controlled by the placement of the respective apertures.

An advantage of the present invention is that a system is provided that can measure slider head flying height versus disk position as often as 300,000 measurements per second.

Another advantage of the present invention is that a system is provided that can dynamically measure slider head flying height transient response to a bump disk.

A further advantage of the present invention is that a system is provided that can dynamically measure glass slider head flying height on a target real disk.

Another advantage of the present invention is that a system is provided that can dynamically measure slider head takeoff and landings.

A still further advantage of the present invention is that a system is provided that can take several hundred thousand sample readings of slider head flying height on a disk each second.

These and other objects and advantages of the present invention will no doubt become obvious to those of ordinary skill in the art after having read the following detailed description of the preferred embodiment which is illustrated in the various drawing figures.

IN THE DRAWINGS

FIG. 3 is a graph showing the relation between slider head flying heights and reflected light amplitudes received by photodetectors from the two diode laser modules included in the system of FIGS. 1 and 2.

DETAILED DESCRIPTION OF THE PREFERRED EMBODIMENT

Figure 1:
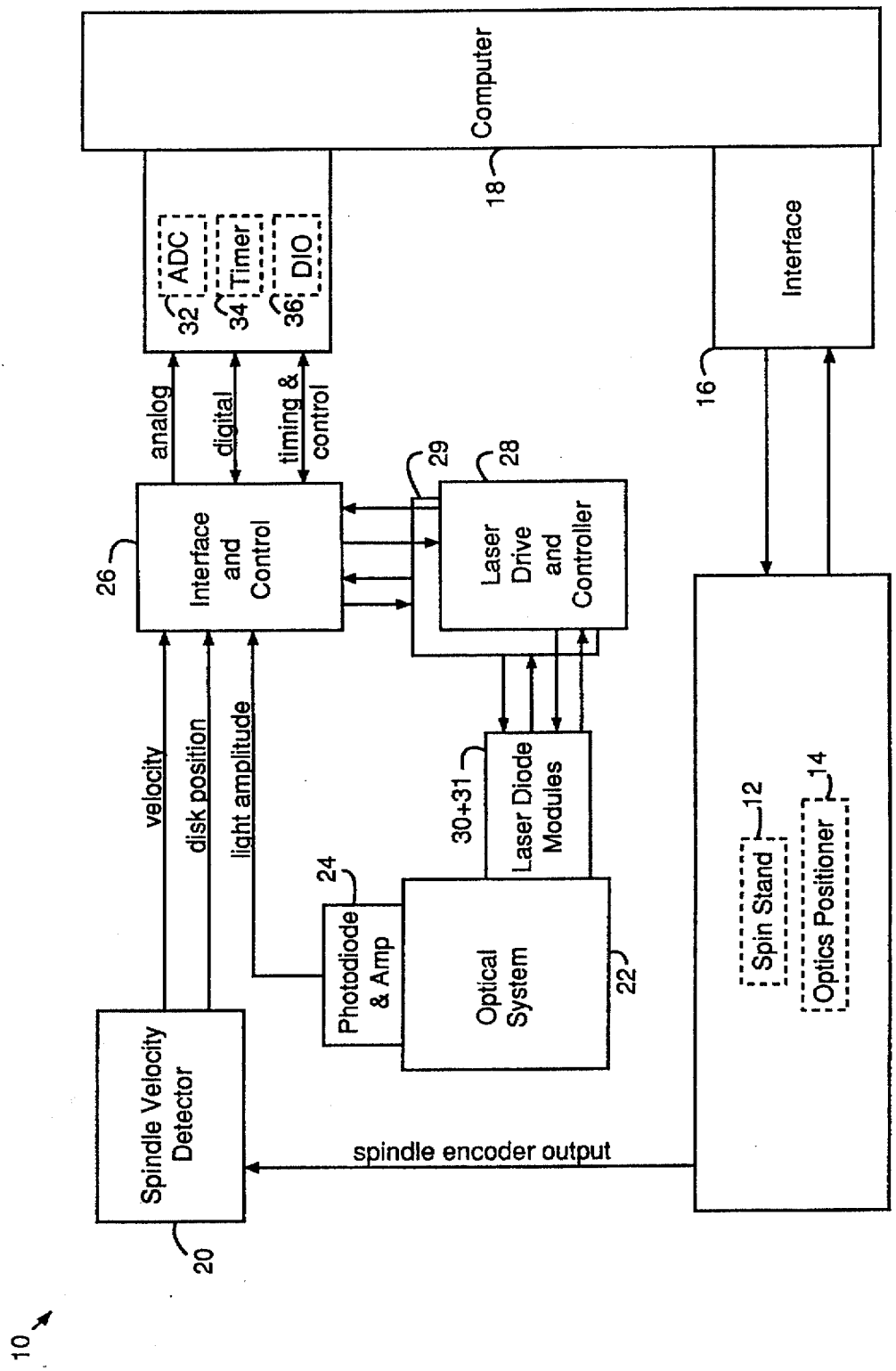
FIG. 1 is a block diagram of a flying height measurement system embodiment of the present invention.

FIG. 1 illustrates a dynamic flying height measurement system embodiment of the present invention, referred to by the general reference numeral 10. System 10 comprises a spin stand 12 with an optics positioner 14, a spin stand interface 16, a personal computer (PC) 18, a spindle velocity detector 20, an optical system 22, a photodiode and amplification unit 24, an interface and control 26, a pair of laser drive and thermal element controllers 28 and 29, a pair of diode laser modules 30 and 31, a multi-channel analog-to-digital converter (ADC) 32, a timer 34 and a digital input/output (DIO) port 36. In an alternative embodiment of system 10, more than just the two diode laser modules 30 and 31 may be used to reduce ambiguities in determining fringe order. Spin stand 12 may include a commercially available unit, such as the FHT-900 marketed by Cambrian Systems, Inc. (Fremont, Calif.). Optics positioner 14 may include a commercially available unit, such as the COMPUMOTOR as marketed by Cambrian Systems, Inc. Spindle velocity detector 20 provides a pair of signals, related to disk velocity and position, that connect to interface and control 26. A photodiode output signal is provided by photodiode and amplification unit 24. A feedback signal is provided by diode laser modules 30 and 31 to controllers 28 and 29 such that a constant amplitude laser light output may be maintained from diode laser modules 30 and 31 by closed-loop proportional servo control of output power or constant-current drive. The operating temperature of diode laser modules 30 and 31 is also maintained by controllers 28 and 29 such that the wavelengths of laser light output by diode laser modules 30 and 31 will remain stable.

PC 18 includes calibration and test application software for interpreting signals received by ADC 32 and DIO port 36 into dynamic flying height measurements based on monochromatic interferometry phenomenon. Test data regarding the actual wavelengths of operation of diode laser modules 30 and 31 are supplied by a user to PC 18 during a calibration period such that the precise wavelengths can be used by the calibration and test application software during an operational period to yield accurate measurement results from system 10.

Figure 2:
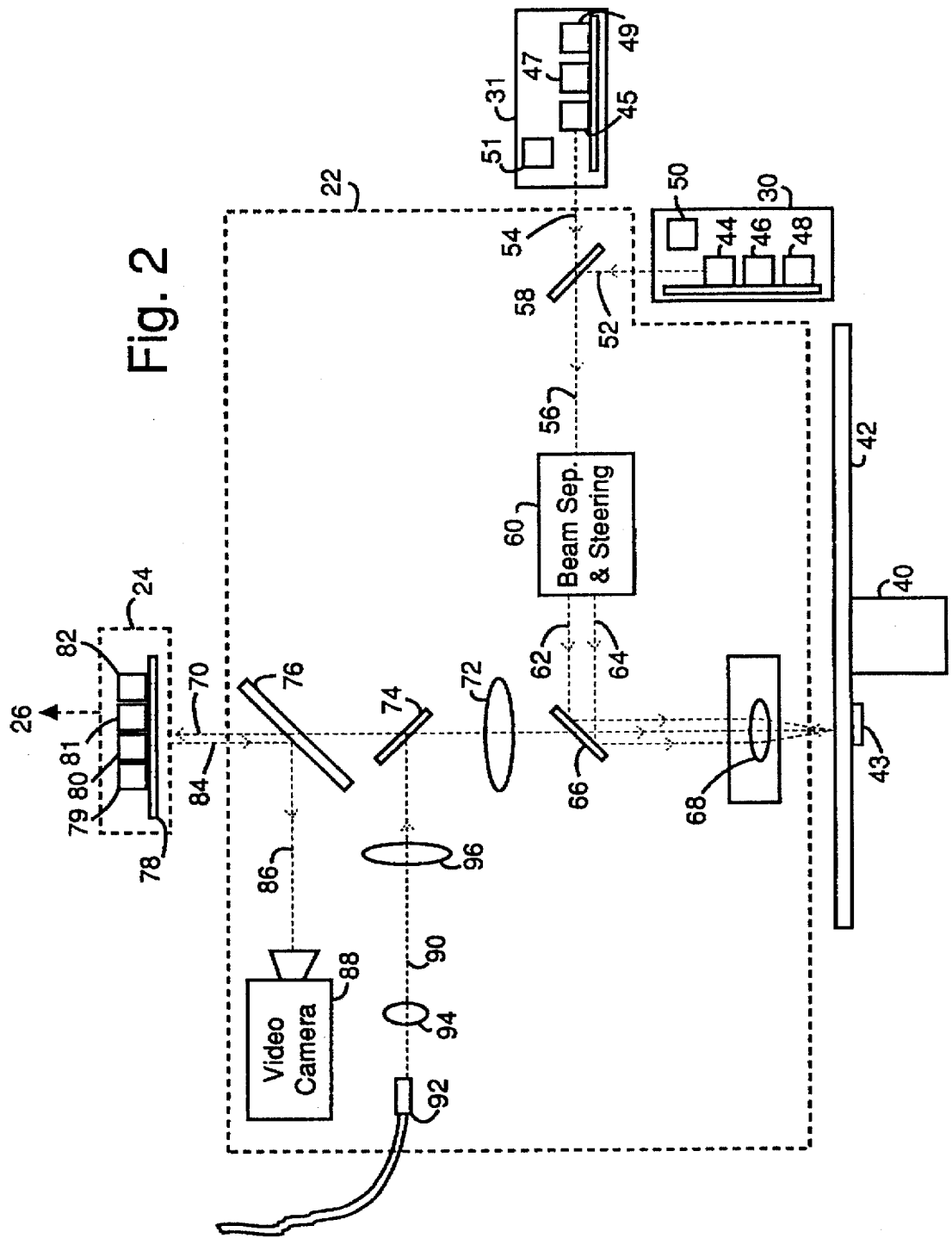
FIG. 2 is a schematic diagram of the optical system included in the system of FIG. 1.

FIG. 2 illustrates optical system 22. A spindle 40 drives a disk 42 associated with a slider 43. The flying height of slider 43 above disk 42 during rotation of disk 42 by spindle 40 creates a gap that will set up characteristic interference in any light that enters the gap according to the dimensions of the gap.

Modules 30 and 31 include a diode laser 44 and 45 that provide coherent light at different wavelengths. For example, 670 nanometers (nm) and 830 nm, respectively, have provided good results. Such wavelengths are nominal and approximate. Initial calibration of system 10 relies on an accurate measurement of the actual wavelengths produced by individual diode lasers 44 and 45, and then on supplying computer 18 with such data so that computations carried out during operation will be dependable in their precision of flying height determinations. Beyond such variations caused by manufacturing deviations, the individual wavelengths of light produced by diode lasers 44 and 45 can vary with operating temperature. Such shifts can be substantial and seriously degrade accuracy if left uncontrolled. Therefore, a pair of thermoelectric devices 46 and 47 are each thermally coupled to diode lasers 44 and 45 to provide cooling. Thermoelectric devices 46 and 47 may comprise commercially available Peltier semiconductors with electrodes for connection to a power supply. A pair of temperature sensors 48 and 49 are each thermally coupled to diode lasers 44 and 45 to monitor the effects of such cooling on the temperature of diode lasers 44 and 45. A pair of photosensitive devices 50 and 51 are each positioned to respectively sample light output from diode lasers 44 and 45 so that the power applied to diode lasers 44 and 45 can be controlled to maintain a constant light amplitude and wavelength output from each. Alternatively, a constant current can be used. An original equipment manufacturer (OEM) diode laser driver with thermoelectric cooler control is commercially available from Melles Griot (Boulder, Col.) as model number 56DLD403 and should produce acceptable results when one each are included in modules 30 and 31. Melles Griot diode lasers 56DOL613 and 56DOL503 are similarly acceptable for use as diode lasers 44 and 45.

According to published sales literature distributed by Melles Griot, in a power stabilized mode, a diode laser's photodiode current may be applied to a feedback loop to which a laser current driver is slaved. Any laser output power fluctuations due to temperature variations can be compensated for by adjusting the laser drive current, and thus maintain the laser's output power constant. However, the photodiode/diode-laser gain will affect the overall gain of the feedback loop. Such gain is generally defined as an incremental change in photodiode current for a given change in diode laser current. The gain ultimately determines the output power stability, modulation bandwidth and noise, and varies from one laser type to another. Therefore, laser drive and controllers 28 and 29 must be such that they can accommodate such variances.

A 670 nm light beam 52 from diode laser 44 and a 830 nm light beam 54 are directed to follow a common path of a light beam 56 by virtue of a beam combiner 58, such as a cold mirror that has a light cutoff wavelength of approximately 700 nm. A beam separator and steering unit 60 produces an output, represented by a pair of beams 62 and 64, that reflects off of a 50/50 beam splitter 66 through a lens 68 to a flying height gap between disk 42 and slider 43. Beams 62 and 64 are composite beams and are intended to illuminate separate points on slider 43. A reflected light beam 70 passes through lens 68, the beam splitter 66, a lens 72, a 30/70 beam splitter 74, a ten percent mirror 76 and an aperture plate and mask 78 to a plurality of photodetectors 79–82 within unit 24. A beam 84 from a mirror surface of aperture plate and mask 78 is directed to mirror 76. This produces a beam 86 that may be viewed by a video camera 88. A white light beam 90 is injected from an external light source, e.g., a xenon lamp, by a fiber optic assembly 92. White light beam 90 is focused by a pair of lenses 94 and 96 to reflect off of mirror 74 and to illuminate the slider 43 through lenses 68 and 72 and mirror 66. Such white light beam 90 ultimately contributes the majority of light imaged by camera 88 as beam 86.

In operation, one or more spots on slider 43 are selected by a user for flying height measurement. White light beam 90 is turned on and this will illuminate slider 43 for viewing by the user through camera 88. The points of measurement that will be detectable by photodiodes 79–82 will appear to the user as spots in the video image of slider 43, due to associated holes in aperture plate 78. Although only four photodiodes 79–82 are illustrated, as few as one and as many as a dozen are possible. More than one photodiode allows simultaneous measurement of flying height of the respective points on slider 43. Dynamic flying height characteristics are made detectable by using, for example, four points of measurement, such as the four outside corners of slider 43.

Each discrete measurement may include turning off white light beam 90. However, with suitable filtering and optimization, white light beam 90 may not need to be turned off because the relative intensities of beams 52 and 54 will typically be far greater than the residual broadband white intensity seen by photodiode unit 24. Laser beam 52 is turned on and the respective intensity of reflected beam 70 is sampled by one or more of photodiodes 79–82. Interface 26 multiplexes in signals from the respective photodiodes 79–82 to ADC 32, which digitizes the measurements for computer 18. Individual data are stored temporarily in a memory included in computer 18. Such data memory storage and organization within computer 18 is conventional, it is therefore not necessary to describe such manipulations here in further detail. Laser beam 52 is then turned off and laser beam 54 is turned on. The respective intensity of reflected beam 70 is again sampled by photodiodes 79–82. Interface 26 multiplexes in signals from the respective photodiodes 79–82 to ADC 32, which digitizes the measurements for computer 18 and stores them apart from the data sampled when laser 52 was on. White light 90 may then be restored so the user can observe slider 43, or another cycle of alternating laser beams 52 and 54 is repeated with another set of samples input to computer 18 from photodiodes 79–82. Samples of the same points taken over time and/or in synchronism with the spinning of disk 42 can yield critical information after calculations by computer 18 about the dynamic flying height characteristics of slider 43 and disk 42. When the points being measured on slider 43 are non-collinear, the pitch, roll, yaw and other three-dimensional behaviors of slider 43 can also be determined with respect to time.

FIG. 3 shows the relationship of the amplitude of light detected by photodetector unit 24 which originates from module 30 versus the flying height of slider 43 as a curve 100. The relationship of the amplitude of light detected by photodetector unit 24 that originates from module 31 versus the flying height of slider 43 is shown as a curve 102. As the flying height of slider 43 on disk 42 is varied, curves 100 and 102 characteristically peak and dip. Such peaks and dips are a function of the constructive and destructive interference of light within the flying height gap between slider 43 and disk 42. Starting at an arbitrary line 104 of equal amplitude for curves 100 and 102, a set of amplitude maximas and minimas 105–112 occur for curve 100 at respective predictable flying heights. Similarly, starting at line 104, a set of amplitude maximas and minimas occur for curve 102 at flying heights that differ from their counterparts in curve 100 because the wavelength of light involved is different.

If it were not for curve 102, it would be very difficult to determine a unique flying height, e.g., at maximas 105 and 107, because each maxima produces approximately the same amplitude that would be detectable by photodiodes 79–82. Curve 102 is used by computer 18 to resolve such integer ambiguities. Individual maximas and minimas for curve 100 can be resolved by inspecting curve 102 (holding the flying height constant). For example, a difference between maximas 105 and 107 is that curve 102 is near its respective maximum at maxima 105, but is only ninety percent (approximately) of its peak value when at maxima 107. Therefore, flying heights within the range can be assessed by computer 18 by comparing the two amplitudes produced from beams 52 and 54 and fitting them to a model, such as is represented by curves 100 and 102. Therefore, it is preferable that laser drive and controllers 28 and 29 (FIG. 1) maintain a constant output amplitude from diode lasers 44 and 45, otherwise any amplitude variations could be attributed to changes in measured flying height.

It is therefore not a requirement of the present invention that the individual laser light outputs of laser modules 30 and 31 be coincident with any particular pair of wavelengths. It is sufficient that the wavelengths actually produced by laser modules 30 and 31 be known with some accuracy, such as is obtainable by testing, e.g., by the commercial supplier of such diode lasers. It is also not a requirement that any particular wavelengths of light output be selected, such as those mentioned in the exemplary embodiment herein. What wavelengths are selected should be sufficiently spectrally separated to allow the integer ambiguity resolution as described in connection with FIG. 3.

Although FIG. 3 shows curves 100 and 102 as being simultaneously present, the light that each curve represents in system 10 is not simultaneously present. Beams 52 and 54 are multiplexed such that only one of them is on at any one time. Photodetector unit 24 is then able to separate which beam 52 or 54 resulted in beam 70 by synchronizing its detection in time with the multiplexing of laser modules 30 and 31. Beam 90 may or may not be shutoff during measurement periods. Beam 90 is principally employed during setup by a user when targeting a measurement spot on slider 43. Beam 86 is returned from slider 43 when beam 90 is on. Camera 88 is then able to produce a video picture for the user with the white light of beams 90 and 86.

For calibration, a bail for slider 43 is typically manipulated such that a slew through a range of flying heights will be simulated. ADC 32 is used to continuously read in signals to computer 18 from photodiode unit 24 while manipulating the bail. A signal will be produced that has a shape resembling curves 100 and 102. From this signal, computer 18 determines the minimum and maximum amplitudes, and can thereby later gauge what percentage of full-scale swing a particular measurement taken thereafter represents.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An improved flying height tester (10) including at least two different-wavelength laser diodes (44, 45) that are time multiplexed through an optical system (58, 60, 66, 68, 72, 74, 76) to a measurement gap and having a photodetector (24) for measuring the amplitude of light reflected from said measurement gap through a pin-hole to determine the dimension of said measurement gap by light interferometrics, the improvement comprising:

emission wavelength stabilization means (28, 29, 46–49) connected to each of said different-wavelength laser diodes (44, 45) for maintaining the respective temperatures of said different-wavelength laser diodes at a constant value, wherein the light emitted by each is maintained at a constant wavelength:

emission amplitude stabilization means (28, 29, 50, 51) connected to each of said different-wavelength laser diodes (44, 45) for maintaining the respective light-output amplitudes of said different-wavelength laser diodes at a constant value:

computer means (18) including calibration and test application software for interpreting signals received by included analog-to-digital connections (26, 32) to said different-wavelength laser diodes (44, 45) and said photodetector (24) into dynamic flying height measurements based on monochromatic interferometry phenomenon, and wherein the actual wavelengths of operation of said different-wavelength laser diodes (44, 45) are predetermined to provide ultimate measurement results that are substantially accurate;

an aperture mask (78) in which said pin-hole is disposed and including a reflective surface surrounding said pin-hole and a partial reflectance mirror (76) the outputs a visual image (84, 86) of said measurement gap, wherein said pin-hole in said visual image marks a point of measurement; and a video camera (88) positioned to receive said visual image output (84, 86) reflected by the aperture mask (78) and mirror (76), wherein a video image marked by said pin-hole is obtained for manual targeting of a measurement.

2. The tester of claim 1, wherein:

the aperture mask (78) further comprises additional pin-holes and said photodetector (24) is a module comprising a plurality of individual photodetectors (79–82) that correspond to said pin-holes and provide for more than one measurement gap on a slider (43) to be selected by a user for flying height measurement.

3. The tester of claim 1, further comprising:

a white light beam (90) focused by a pair of lenses (94 and 96) to reflect off of a mirror (74) and to illuminate said measurement gap and providing for a majority of light imaged by the video camera (88) as said visual image output (84, 86).

4. An improved flying height tester (10) including at least two different-wavelength laser diodes (44, 45) that are time multiplexed through an optical system (58, 60, 66, 68, 72, 74, 76) to a measurement gap and having a photodetector (24) for measuring the amplitude of light reflected from said measurement gap through a pin-hole to determine the dimension of said measurement gap by light interferometrics, the improvement comprising:

an aperture mask (78) in which said pin-hole is disposed and including a reflective surface surrounding said pin-hole and a partial reflectance mirror (76) that outputs a visual image (84, 86) of said measurement gap, wherein said pin-hole in said visual image marks a point of measurement;

a video camera (88) positioned to receive said visual image output (84, 86) reflected by the aperture mask (78) and mirror (76), wherein a video image marked by said pin-hole is obtained for manual targeting of a measurement; and computer means (18) including calibration and test application software for interpreting signals received by included analog-to-digital connections (26, 32) to said different-wavelength laser diodes (44, 45) and said photodetector (24) into dynamic flying height measurements based on monochromatic interferometry phenomenon, and wherein the actual wavelengths of operation of said different-wavelength laser diodes (44, 45) are predetermined to provide ultimate measurement results that are substantially accurate.

5. The tester of claim 4 wherein:

the aperture mask (78) further comprises additional pin-holes and said photodetector (24) is a module comprising a plurality of individual photodetectors (79–82) that correspond to said pin-holes and provide for more than one measurement gap on a slider (43) to be selected by a user for flying height measurement.

\* \* \* \* \*